United States Patent
Jalpa et al.

(12)

(10) Patent No.: US 10,150,520 B1
(45) Date of Patent: Dec. 11, 2018

(54) SPARE TIRE RETAINING CLAMP AND TOOL KIT

(71) Applicant: Ford Global Technologies, LLC, Dearborn, MI (US)

(72) Inventors: Jonathan Kaleb Jalpa, Azcapotzalco (MX); Nicole Pamela Herrera Gutierrez, Mexico City (MX); Eva Talia Huerta, Narvarte (MX); Federico Emilio Mejia Barajas, Huixquilucan (MX); Jorge Adolfo Miranda Nieto, Guanajuato (MX)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/870,170

(22) Filed: Jan. 12, 2018

(51) Int. Cl.
*B62D 43/00* (2006.01)
*B62D 43/10* (2006.01)

(52) U.S. Cl.
CPC .................................... *B62D 43/10* (2013.01)

(58) Field of Classification Search
CPC ............................... B62D 43/10; B60R 11/06
USPC ......... 224/42.13, 42.14, 42.12, 42.24, 42.26; 292/256, 256.6, 256.67, 256.71
See application file for complete search history.

(56) References Cited

U.S. PATENT DOCUMENTS

| 1,008,680 | A | | 11/1911 | Temple |
| 4,498,614 | A | * | 2/1985 | Guarr ...................... B60R 11/06 224/42.13 |
| 4,794,771 | A | * | 1/1989 | Princell ................ B62D 43/045 224/42.23 |
| 5,118,017 | A | | 6/1992 | Buck |
| 5,638,710 | A | * | 6/1997 | Howard, Jr. ......... B62D 43/007 224/42.23 |
| 7,036,697 | B2 | | 5/2006 | Hwang et al. |
| 9,707,904 | B2 | | 7/2017 | Francis et al. |
| 2012/0031934 | A1 | | 2/2012 | Danze |

* cited by examiner

*Primary Examiner* — Adam Waggenspack
(74) *Attorney, Agent, or Firm* — Jason Rogers; Brooks Kushman P.C.

(57) ABSTRACT

A spare tire retainer includes a plurality of studs fixed to and extending from one surface of a supporting wall. A tire is assembled to a wheel that defines a plurality of holes that are adapted to receive the plurality of studs. A clamp is assembled to the plurality of studs to secure the wheel to the supporting wall. The plurality of studs may be weld studs that are welded to the supporting wall. The plurality of studs may each define a notch in one side and the clamp may be received in the notches when the clamp is assembled to the studs. A container for a set of tools used to replace a tire is disclosed that may be assembled to the wheel. A plurality of clips is disclosed for securing the container to the wheel. The clips engage a rim of the wheel radially inside the tire. The container may be assembled to the wheel after the clamp secures the wheel to the studs.

17 Claims, 2 Drawing Sheets

SPARE TIRE RETAINING CLAMP AND TOOL KIT

TECHNICAL FIELD

This disclosure relates to a combined retaining clamp and tool kit for a spare tire in a vehicle.

BACKGROUND

A spare tire may be carried on the floor pan of the trunk of a vehicle to replace a flat tire. A spare tire tool kit including a jack and lug nut wrench is generally provided and is stored with the spare tire.

One way of securing a spare tire in a vehicle is to insert a central screw into the central hub opening of the wheel that is pivotally attached to the floor pan. This approach is problematic because the tire blocks the view of the connector on the floor pan that the central screw is intended to be attached.

A spare tire on a wheel that includes a central decorative medallion is difficult to attach because the medallion may block or restrict the central screw from being attached to the floor pan.

A spare tire tool kit may also complicate the process of securing the spare tire to the floor pan. If the spare tire tool kit is stacked on top of the wheel of the spare tire, the distance between the top of the tool kit and the floor pan is increased and makes it more difficult to fish the central screw through the spare tire and the tool kit.

This disclosure is directed to solving the above problems and other problems as summarized below.

SUMMARY

According to one aspect of this disclosure, a spare tire retainer is disclosed that includes a plurality of studs fixed to and extending from one surface of a supporting wall. A tire is assembled to a wheel that defines a plurality of holes that are adapted to receive the plurality of studs. A clamp is assembled to the plurality of studs to secure the wheel to the supporting wall.

According to other aspects of this disclosure, the supporting wall may be a floor pan of a trunk compartment. The plurality of studs may be weld studs that are welded to the supporting wall. The plurality of studs may each define a notch in one side and the clamp may be received in the notches when the clamp is assembled to the studs.

The spare tire retainer may further comprise a container for a set of tools used to replace a tire that may be assembled to the wheel and a plurality of clips for securing the container to the wheel. The clips may be adapted to engage a rim of the wheel radially inside the tire. The container may be assembled to the wheel after the clamp secures the wheel to the studs.

According to another aspect of this disclosure, a spare tire retainer is disclosed for a vehicle having compartment for a spare tire mounted on a wheel that defines a plurality holes. The retainer includes a plurality of studs affixed to the compartment and a clamp that may be attached to the studs to secure the wheel to a floor of the compartment. The clamp may have an open position for assembling the clamp to the studs and a closed position for locking the clamp on the studs.

According to another aspect of this disclosure, a vehicle is disclosed that includes a tire mounted on a wheel defining a plurality of holes that is secured to a compartment floor. A plurality of studs may be fixed to the compartment floor. A clamp may be provided that defines a plurality of cut-outs for receiving the studs. The clamp may be a split ring clamp that has an open position in which the clamp is fitted onto the studs and a closed position in which the receptacles are locked on the studs to secure the wheel to the compartment floor. The clamp may include a latch that holds the split ring together in the closed position.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
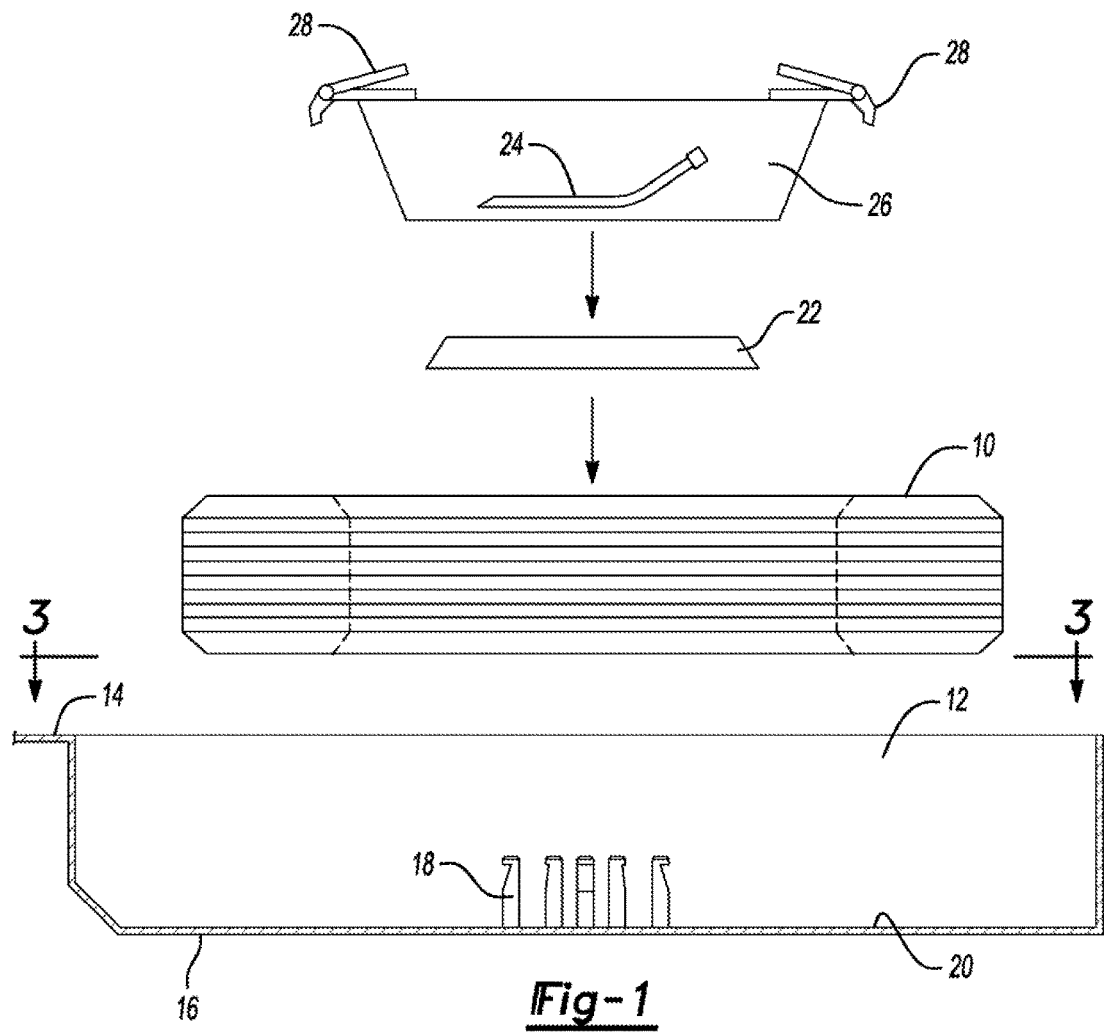
FIG. 1 is an exploded perspective view of a spare tire storage compartment in a trunk compartment of a vehicle, a spare tire, a ring clamp, and a tool container according to one aspect of this disclosure.

Referring to FIG. 1, a spare tire 10 is shown in position to be stored in a storage compartment 12 of the trunk compartment 14 of a vehicle. The storage compartment 12 includes a supporting wall 16 that is part of the floor pan of the trunk compartment 14. A plurality of studs 18 are welded to the supporting wall 16. The studs 18 may be weld studs that are adapted to be welded directly to an upper surface 20 of the supporting wall 16 in a resistance welding operation.

A ring clamp 22 is illustrated disposed above the spare tire 10 that is adapted to receive the studs 18 to secure the spare tire 10 to the supporting wall 16. The ring clamp may be a continuous ring having cut-outs for providing clearance for the studs 18. Alternatively, a split ring clamp may be provided that is opened to receive the studs 18 and closed to latch onto the studs 18. When closed the split ring clap secures the spare tire 10 to the studs 18 as will be more fully described with reference to FIG. 4 below.

A set of tire changing tools 24 are stored within a container 26 that is assembled over the ring clamp 22 and spare tire 10. The container 26 is secured to the spare tire 10 with a plurality of clips 28 as will be more fully described with reference to FIG. 2 below.

Figure 2:
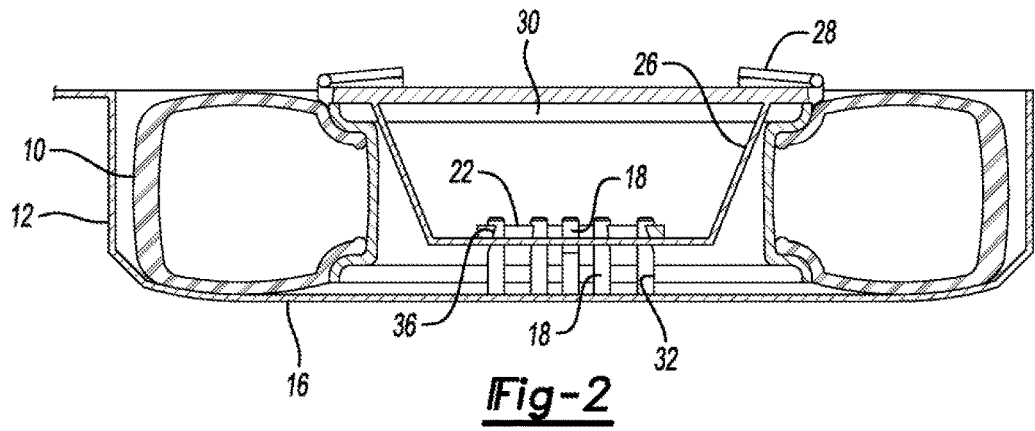
FIG. 2 is a partial cross-section view illustrating the spare tire storage compartment in the trunk compartment of the vehicle, the spare tire, the ring clamp, and the tool container of FIG. 1 shown being assembled together.

Referring to FIG. 2, the spare tire 10 is shown assembled into the storage compartment 12 inside the trunk compartment 14 of the vehicle. The spare tire 10 is mounted on a wheel rim 30 that includes a plurality of holes 32 that receive wheel hub studs when assembled to a wheel hub of the vehicle. When stored in the storage compartment 12, the studs 18 are received in the wheel stud holes 32 to attach the wheel rim 30 to the supporting wall 16.

Figure 4:
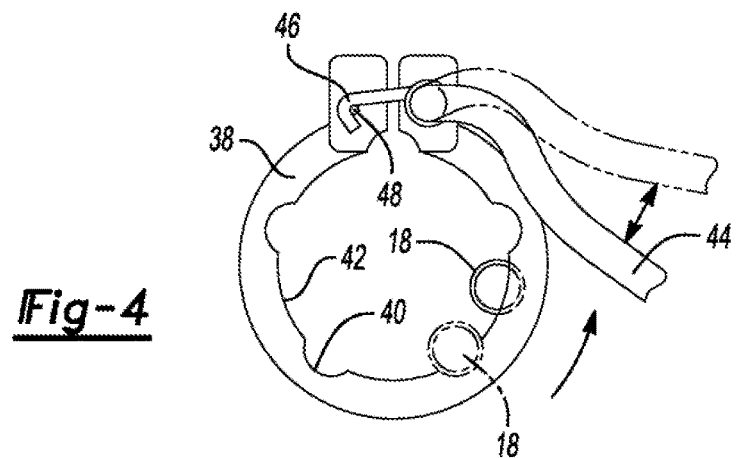
FIG. 4 is a top plan view of a split-ring clamp.

The studs 18 each include a notch 36 on a radially outwardly facing side that cooperates with the ring clamp 22 or a split ring clamp 38, as shown in FIG. 4 below. The container 26 is assembled over the wheel rim 30 and the ring clamp 22 (or split ring clamp 38). The container 26 is securely attached to the rim 30 by the clips 28.

Figure 3:
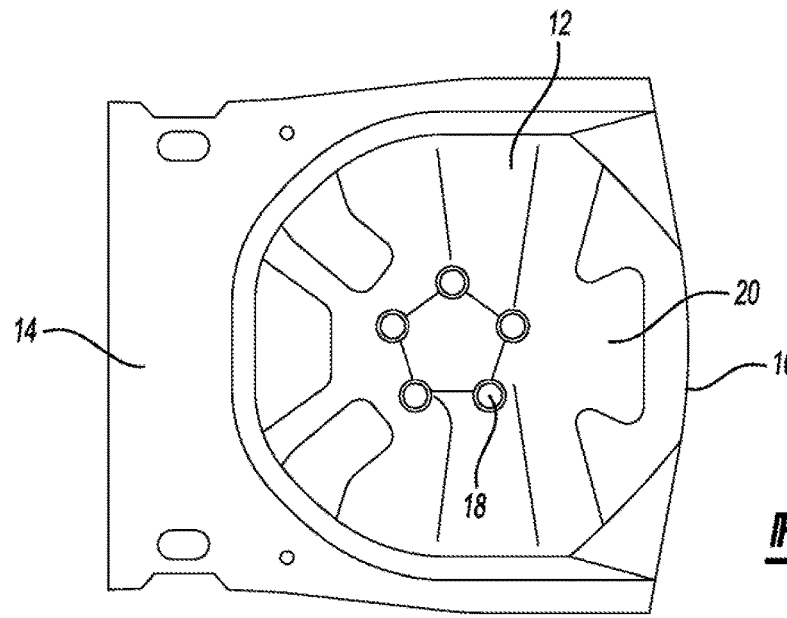
FIG. 3 is a top plan view of the storage compartment within the trunk compartment of the vehicle taken along the line 3-3 in FIG. 1.

Referring to FIG. 3, the storage compartment 12 is shown in the trunk compartment of the vehicle. The studs 18 are welded to the top surface 20 of the floor pan 16.

Referring to FIG. 4, the split ring clamp 38 is illustrated with a plurality of cut-outs 40 that are provided to facilitate assembly over the studs 18. The cut-outs 40 may be provided in the clamp ring 22 in which case the ring clamp 22 may receive the studs through the cut-outs and the ring 22 may be rotated to cause the notches to be retained by an inner diameter lip 42. In the split ring clamp embodiment 38, the cut-outs provide clearance for the studs 18 and the clamp 38 may be closed to engage the notches 36. Alternatively, the split ring clamp may be rotated as with the ring clamp 22 embodiment and closed to secure the clamp 38 to the studs 18.

The split ring clamp 38 may be provided with a handle 44 that is operatively attached to a latch hook 46. The latch hook 46 is oriented to be hooked over a pin 48 to close the split ring clamp 38 and be unhooked from the pin 48 to release the clamp 38.

Figure 5:
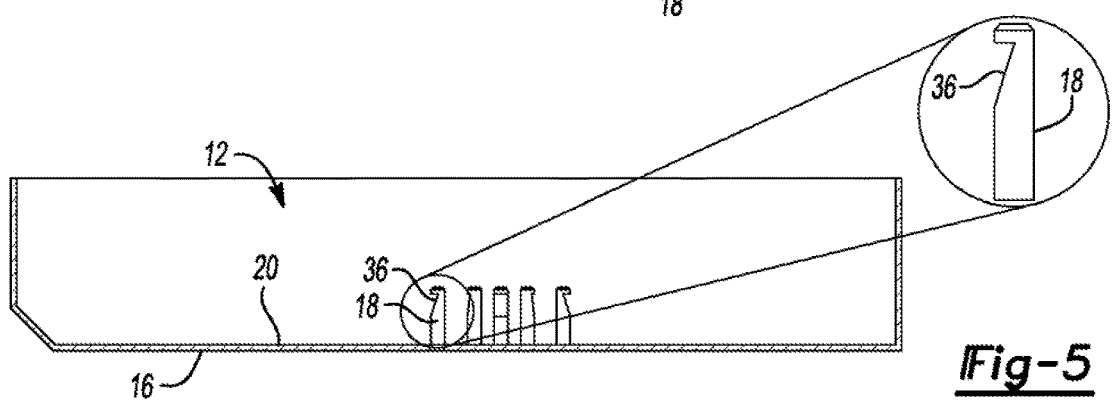
FIG. 5 is a cross-section view of the storage compartment shown in FIG. 1 with a plurality of studs welded to the floor of the storage compartment.

Referring to FIG. 5, the storage compartment 12 is illustrated to show the studs 18 as welded to the top surface 20 of the supporting wall 16. The studs 18 define the notches 36 in the radially outwardly facing surfaces of the studs 18. The notches 36 are adapted to receive the ring clamp 22 or split ring clamp 38 as previously described.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and includes modifications of the illustrated embodiments.

What is claimed is:

1. A spare tire retainer comprising:
a supporting wall;
plural studs fixed to and extending from the supporting wall;
a tire assembled to a wheel, the wheel defining plural holes that are each adapted to receive one of the plural studs; and
a clamp assembled to all of the plural studs to secure the wheel to the supporting wall, the clamp being received in a notch defined in each stud when assembled to the studs.

2. The spare tire retainer of claim 1 wherein the supporting wall is a floor pan of a trunk compartment.

3. The spare tire retainer of claim 1 wherein the plurality of studs are weld studs that are welded to the supporting wall.

4. The spare tire retainer of claim 1 further comprising:
a container for a set of tools used to replace a tire, the container being assembled to the wheel; and
a plurality of clips that secure the container to the wheel.

5. The spare tire retainer of claim 4 wherein the plurality of clips engage a rim of the wheel radially inside the tire.

6. The spare tire retainer of claim 4 wherein the container is assembled to the wheel after the clamp secures the wheel to the studs.

7. A retainer for a spare tire mounted on a wheel defining plural holes comprising:
plural studs affixed to a compartment and received in the holes; and
a clamp attachable to all of the studs each defining a notch in a side thereof, the clamp securing the wheel to the studs, wherein the clamp has an open position for assembling the clamp to the studs and a closed position in which the clamp is received in each of the notches for locking the clamp on the studs.

8. The spare tire retainer of claim 7 wherein the compartment includes a floor pan of a trunk compartment.

9. The spare tire retainer of claim 7 wherein the plurality of studs is welded to the floor.

10. The spare tire retainer of claim 7 further comprising:
a container for a set of tools used to replace a tire, the container being assembled to the wheel; and
a plurality of clips that secure the container to the wheel.

11. The spare tire retainer of claim 10 wherein the plurality of clips engages a rim of the wheel radially inside the tire.

12. The spare tire retainer of claim 10 wherein the container is assembled to the wheel after the clamp secures the wheel to the studs.

13. A vehicle including a wheel defining a plurality of holes, the vehicle comprising:
a compartment floor;
studs fixed to the compartment floor, the studs each defining a notch on a side; and
a clamp defining plural receptacles, the clamp having an open position wherein the clamp is fitted over the studs and a closed position wherein each of the receptacles are received in the notches to secure the wheel to the compartment floor.

14. The vehicle of claim 13 further comprising:
a container for a set of tools used to replace a tire, the container being assembled to the wheel; and
a plurality of clips that secure the container to the wheel.

15. The vehicle of claim 14 wherein the plurality of clips engages a rim of the wheel radially inside the tire.

16. The vehicle of claim 14 wherein the container is assembled to the wheel after the clamp secures the wheel to the studs.

17. The vehicle of claim 13 wherein the clamp is a split ring clamp including a latch that holds the split ring clamp together in the closed position.

* * * * *